(12) United States Patent
Dando (10) Patent No.: US 6,944,829 B2
(45) Date of Patent: Sep. 13, 2005

(54) CONFIGURABLE USER-INTERFACE COMPONENT MANAGEMENT SYSTEM

(75) Inventor: Owen Dando, Edinburgh (GB)

(73) Assignee: Wind River Systems, Inc., Alameda, CA (US)

(*) Notice: Subject to any disclaimer, the term of this patent is extended or adjusted under 35 U.S.C. 154(b) by 625 days.

(21) Appl. No.: 09/963,188

(22) Filed: Sep. 25, 2001

(65) Prior Publication Data

US 2003/0058286 A1 Mar. 27, 2003

(51) Int. Cl.[7] .............................. G06F 9/00; G06F 3/00; G06F 17/00
(52) U.S. Cl. .................. 715/798; 715/841; 715/842; 715/853; 715/788; 715/790; 715/810
(58) Field of Search .................. 345/804, 798, 345/788, 821, 979, 837

(56) References Cited

U.S. PATENT DOCUMENTS

| | | | | |
|---|---|---|---|---|
| 5,801,701 A | * | 9/1998 | Koppolu et al. | 345/821 |
| 5,870,091 A | * | 2/1999 | Lazarony et al. | 345/804 |
| 5,886,694 A | * | 3/1999 | Breinberg et al. | 345/788 |
| 5,977,973 A | * | 11/1999 | Sobeski et al. | 345/798 |

* cited by examiner

Primary Examiner—Kristine Kincaid
Assistant Examiner—Boris Pesin
(74) Attorney, Agent, or Firm—Davidson, Davidson & Kappel, LLC (57) ABSTRACT

A configurable user-interface component management system and method are provided where frame containers contain a number of child components and user-interface components. The frame containers and their children are arranged in a specific hierarchy that determine their on-screen appearance. The hierarchy is a result of the software architecture of the software objects corresponding to the visual on-screen objects. The user-interface components in each visual component are configured based on certain, predetermined policies. The method of managing the frame containers and their children includes waiting for an event that affects a frame and then responding by creating a frame, destroying a frame, changing a hierarchy order, moving a frame from one hierarchy to another, or sizing a frame, after which the appropriate policies are removed and applied as needed, affected hierarchies reconfigured and then saved.

19 Claims, 6 Drawing Sheets

CONFIGURABLE USER-INTERFACE COMPONENT MANAGEMENT SYSTEM

BACKGROUND

Computer systems typically display output and user interfaces in a graphical layout with a number of windows. This display format is known as a graphical user interface, or GUI. Each window is generally rectangular and is made up of a frame that contains a view, which is typically some visual input/output interface. The frame has a title bar for the title of the window, a menu bar, and, in some cases, a tool bar. The frame functions to define the edges of the window and separates its contents from the rest of the display and other GUI elements.

The menu bar is a menu of executable actions that can be performed by the program or application represented by the window on the data contained in its view. The menu bar itself is a list of headings that, when clicked, displays a pull-down menu of executable actions grouped under the menu bar heading. Tool bars contain shortcuts to the more commonly used actions available in the menu bar in the form of graphical representations or buttons, known as icons. For example, a print command is represented by a small picture of a printer.

Development of a project on a computer system may require that the display contain a number of windows at the same time, each window with a GUI component that correlates to some aspect or part of project development, such as a project management component, a source file editor component, and a debugger control component, in the case of developing some large software product.

Integrated development environments (IDE) manage the set of graphical user-interface components that constitute a project. Frame management systems handle the arrangement of GUIs and their corresponding menus and toolbars within a frame. For example, a typical frame management system may specify the arrangement of user-interface components and views in the windows of an environment on the user's desktop; specify how and where new views appear, how configurations are saved when a window is closed or an environment (operating system) is terminated; and manage the menu items and toolbar buttons for each of the windows.

Software applications often make use of menus and toolbars to allow users to select different functions and options in a graphical user interface. Generally, menu items and tool items, which are associated with the functions and options, make up the menu bar or toolbar. Menubars and toolbars function both in MDI environments and SDI environments. In an MDI (Multiple Document Interface) environment, a single parent window contains any number of child windows. The menus and/or toolbars associated with each child window are displayed on a frame of the parent window. In an SDI (Single Document Interface) environment, new windows are spawned for each user visible process or view, and a new menu and/or toolbar is placed on the frame of each new window.

In an MDI environment, the menus and toolbars, with their associated menu and tool bar items need to be modified as different applications are opened in the child windows, and as these applications gain or lose focus, so that an appropriate set of menus and toolbars are available to the user. The enabling, disabling, and changing of the menu and toolbar options are conventionally implemented by source level programming.

The above example systems, however, are limited in their configurablity. In addition, configuration of the windows and their corresponding menus and toolbars are not automatic with the addition of components or any other manipulation of the graphical display.

SUMMARY OF THE INVENTION

In accordance with a first embodiment of the present invention, a method for displaying a graphical user interface comprises providing a plurality of generic frame objects in a hierarchy, and providing a plurality of container components, wherein each of the plurality of container components define a respective menu/toolbar layout. A first one of the plurality of container components is associated with a first one of the plurality of generic frame objects. A frame is displayed on a display, wherein a position of the frame and the menu/toolbar layout of the frame is a function of the first one of the plurality of container components, the first one of the plurality of generic frame objects, and any ancestor object of the first one of the plurality of generic frame objects. In response to an event, the first one of the plurality of container components is disassociated from the first one of the plurality of generic frame objects, and associated with a second one of the plurality of generic frame objects. The frame is then displayed on the display, wherein a position of the frame and the menu/toolbar layout of the frame is a function of the first one of the plurality of container components, the second one of the plurality of generic frame objects, and any ancestor object of the second one of the plurality of generic frame objects.

In accordance with a second embodiment of the present invention, a method for displaying a graphical user interface is provided. In accordance with this method, a first frame is displayed, and the first frame has a first menu/toolbar configuration. Information indicative of a first policy for the first menu/toolbar configuration is contained in a first data file. A second frame is displayed and the second frame has a second menu/toolbar configuration. Information indicative of a second policy for the second menu/toolbar configuration is contained in a second data file. In response to user interaction, the second frame is dragged over the first frame, the second frame is displayed as a child frame of the first frame, and the first and second menu/toolbar configurations are modified based upon the first and second policies.

In accordance with a third embodiment of the present invention, a method for displaying a graphical user interface is provided which comprises providing a plurality of generic frame objects in a hierarchical tree, and providing a plurality of container component objects, wherein each of the plurality of container components define a respective menu/toolbar layout. The method further comprises providing a component (e.g., a view component, dialog component, or other container component), associating the component with a first one of the plurality of container components, associating the first one of the plurality of container components with a first one of the plurality of generic frame objects, and displaying the component in a frame on a display, wherein a position of the frame and the menu/toolbar layout of the frame is a function of the first one of the plurality of container components, the first one of the plurality of generic frame objects, and any ancestor object of the first one of the plurality of generic frame objects. In response to an event, the first one of the plurality of container components is disassociated from the first one of the plurality of generic frame objects and associated with a second one of the plurality of generic frame objects. The component is then displayed in the frame on the display, wherein a position of the frame and the menu/toolbar layout of the frame is a function of the first one of the plurality of container components, the second one of the plurality of generic frame objects, and any ancestor object of the second one of the plurality of generic software objects.

In accordance with a fourth embodiment of the present invention, a method of displaying a graphical user interface comprises providing a plurality of components including an SDI container object and an MDI container object. The SDI container object defines a single document interface environment where a number of views are configured with each view having a corresponding menu bar and/or a corresponding tool bar, and the MDI continer object defines a multiple document interface where a parent view and a number of child views are configured, and wherein a common menu bar and/or common tool bar is provided for the parent view and the number of child views. A plurality of generic frame objects are provided, wherein the generic frame objects include a tabbed frame object, an internal frame object, and a frame object. The method further comprises providing a component, associating the component with a first one of the plurality of components, associating the first one of the plurality of components with a first one of the plurality of generic frame objects, and displaying the component in a frame on a display, wherein a position of the frame and the menu/toolbar layout of the frame is a function of the first one of the plurality of components and the first one of the plurality of generic frame objects. In response to an event, the component is disassociated from the first one of the plurality of components and associated with a second one of the plurality of components, the second one of the plurality of components being associated with one of the generic frame objects. The component is then displayed in the frame on the display, wherein a position of the frame and the menu/toolbar layout of the frame is a function of the second one of the plurality of components and its associated one of the plurality of generic frame objects.

In accordance with a fifth embodiment of the present invention, a configurable user-interface frame management system is provided which includes a plurality of components arranged in a hierarchy, wherein each of the components has a component interface. The components include view components and container components, each container component defining a layout. The system also includes a frame manager. In response to an event, the frame manager interacts with the component interface of each of the components to add and remove child components from the hierarchy, and, based on an association between a view, a selected component in the hierarchy, configures the view in the selected components.

In accordance with a sixth embodiment of the present invention, a method for displaying a graphical user interface is provided comprising the steps of: populating a display with a number of frames, each frame having one or more of a title bar and a menu/toolbar configuration; organizing the frames in one or more hierarchies, wherein a position of each frame on the display and the position of any title bar and menu/toolbar configuration of each frame is a function of a location of each frame in the one or more hierarchical trees; and, in response to an event, changing the location of one or more of the frames in the one or more hierarchical trees.

In accordance with a seventh embodiment of the present invention, a method for displaying a graphical user interface is provided which includes providing a plurality of container components in a hierarchy, wherein each of the plurality of container components defines a respective menu/toolbar layout. Each of the plurality of container components is associated with a corresponding one of a plurality of generic frame objects and each of the plurality of generic frame objects has a corresponding frame displayed on a display. A position of each frame and the menu/toolbar layout of each frame is a function of its corresponding generic frame object and ancestors thereof in the hierarchy and its corresponding container component and ancestors thereof in the hierarchy. In response to an event, the hierachy is changed. Based on the changed hiearchy, the method disassociates at least one of the plurality of container components from its corresponding generic frame object and associates each of the at least one of the plurality of container components with another one of the plurality of generic frame objects. The position of each frame and the menu/toolbar layout of each frame is then a function of its corresponding generic frame object and ancestors thereof in the changed hierarchy and its corresponding container component and ancestors thereof in the changed hierarchy.

In accordance with other embodiments of the present invention, computer readable media are provided which have stored thereon computer executable process steps operable to control a computer to implement the embodiments described above.

BRIEF DESCRIPTION OF THE DRAWINGS

FIG. 6b is a flowchart for the alter order sub-process of FIG. 6a.

DETAILED DESCRIPTION OF THE PREFERRED EMBODIMENTS

In accordance with one embodiment of the present invention, a configurable user-interface frame management system is provided comprising a plurality of components, each one with a component interface; a plurality of user-interface components (menu bars and tool bars); a frame manager; a user-interface component configuration object that stores specific policies for policy-based merging of the user-interface components; and a container state object for each component that saves the state of its corresponding component. Examples of components include view components, dialog components, and container components. A container component is a component that is capable of holding another component. Each container component defines a different GUI layout, such as an MDI layout, an SDI layout, a tabbed layout, a split pane layout, etc. A container component can hold any other component, including other container components, view components, and dialog components.

Each container component contains one or more of the following: child container components, user-interface components, dialog components, and view components. A top level container component and its child container components are configured according to a specific hierarchy, and each view or dialog component is associated with one of the container components in the hierarchy. The user-interface components are configured according to the specific policies in the user-interface component configuration object, and the view is displayed on a display screen in a frame according to the layout defined by the container component it is associated with, and that container component's position in the hierarchy.

The frame manager interacts with the interface of each component to configure the hierarchies, user-interface components and views by submitting requests to the appropriate components via their interface. The component interfaces then access and invoke the necessary functions and operations. To add and remove child container components from a hierarchy, the frame manager submits a request to the interface of the particular container component to be added or removed to change its parent reference, and thus, change its hierarchical position. To configure user-interface components, after receiving a request from the frame manager, the component interface invokes the user-interface component configuration object to configure the user-interface components according to its stored policies. To configure a view or a child container component, the container component interface responds to a request from the frame manager by invoking the layout defined by its container component. The view or child container component is displayed in a frame on the display screen. In this regard, the display screen displays frames in a hierarchy that corresponds to the component hierarchy. Each container state object includes sufficient information to save the specific hierarchy, user-interface configuration, and the particular layout of its corresponding container component.

In accordance with another embodiment of the present invention, a method for managing frames in a configurable user-interface is also provided comprising the steps of populating a display with a graphical user interface including of a number of frames and accepting a frame event. An event queue is continually monitored for an incoming frame event, or an event that affects a frame in some way, from a particular source, like an operating system or some other software object. Frame events include a create frame event, destroy frame event, alter frame order event, drag and drop frame event, and size frame event.

To create a frame when a create frame event is received, a request is submitted to an interface of a component (e.g., a container component or view component) to create a frame. The component interface accesses a generic frame to create the requested frame on the display and configures corresponding user-interface components for the created frame according to predetermined policies by accessing a properties file (discussed below).

Destroying a frame is accomplished by submitting a request to the interface of the component corresponding to the frame to be destroyed, destroying the component, and removing the policies of the destroyed component from the user-interface components in the display.

An alter order event occurs when the members of a certain hierarchy do not change, but their order does, usually as a result of a change in focus. When an element gains focus, it is brought to the top of a hierarchy and displayed above the other components in its hierarchy. To alter the order of a hierarchy, focus is removed from an original focus element, as are its corresponding policies, focus is transferred to the new focus element, and its policies are applied.

A drag and drop event places the dragged frame in a specified location by removing the component corresponding to the dragged frame from an old hierarchy and adding it to a new hierarchy. The menus and toolbars are then modified to reflect the new hierarchy.

A size frame event can be either a minimize event or a restore event. For a minimize frame event, the frame is minimized and its policies removed. For a restore event, the frame is restored to its original size and its policies added. A maximizing event is the same as a restore event, only the frame is maximized.

After each of the events above, the hierarchy is reconfigured to reflect the changes that result from the frame event and the reconfigured hierarchy is preferably saved in a software object designed to encode sufficient information about the state of the components in the configurable user-interface to recreate the display.

In accordance with a preferred embodiment of the present invention, the container component hierarchy is defined by how the container components reference each other. Put another way, a software object that references another is a child of the referenced object, so a child container component references a parent container component.

Each container component holds at least one user interface component and a number of child container components. A particular integrated development environment will include a hierarchy of container components and other components headed by a special root container component that represents the screen. At the top of each sub-hierarchy, a head container component, a child of the root container component, is displayed in a native operating system window (its frame object corresponding to a JFrame or JDialog as appropriate). At each level of the hierarchy below, container components layout their child components, and at the bottom of the hierarchy are frame container components that are either empty or contain a view or dialog component.

The description of the actual layout of user-interface components and child container components is independent of the container component itself. Therefore, any container component can hold any other type of container component as a child. Any component (e.g., view, dialog, container) can be removed from its parent and dragged to a new parent container component or hierarchy. Thus, users are afforded a level of configurablity heretofore unrealized by prior art systems.

As explained below, the frame management system according to certain embodiments of the present invention can provide:

Multiple hierarchies of container components with different layout styles among the container components, i.e., a tiled layout in one container component and a tabbed layout in another.

Drag and drop of components from one parent container component to another or to an entirely new hierarchy.

Merging of component menus and toolbars at multiple levels within hierarchies based on predetermined policies.

Saving and restoring of hierarchy states.

Property-based specification and constraint of frame manager behavior.

The IDE in accordance with a preferred embodiment of the present invention has at least two modes of frame management: the Single Window mode and Desktop mode. Single Window mode is a Single Document Interface (SDI) frame manager where each view appears in its own separate top-level window. The menu items and toolbar buttons representing the executable view actions for a particular view appear in the menubar and toolbars within that particular view's windows. Desktop mode is a Multiple Document Interface (MDI) frame manager. Views appear in sub-windows internal to a main top-level 'desktop' window. In this mode, views may be docked against the side of the desktop or floated in their own separate windows outside the desktop. The menu items for executable actions associated with the views in the desktop are merged onto a single menubar in the desktop window, including the menu items for those views residing in their own separate floating window. Toolbars are treated in a similar fashion so that toolbars representing executable view actions are merged together into the 'main' desktop toolbars, unless the toolbar is designated internal to the view component.

Figure 1:
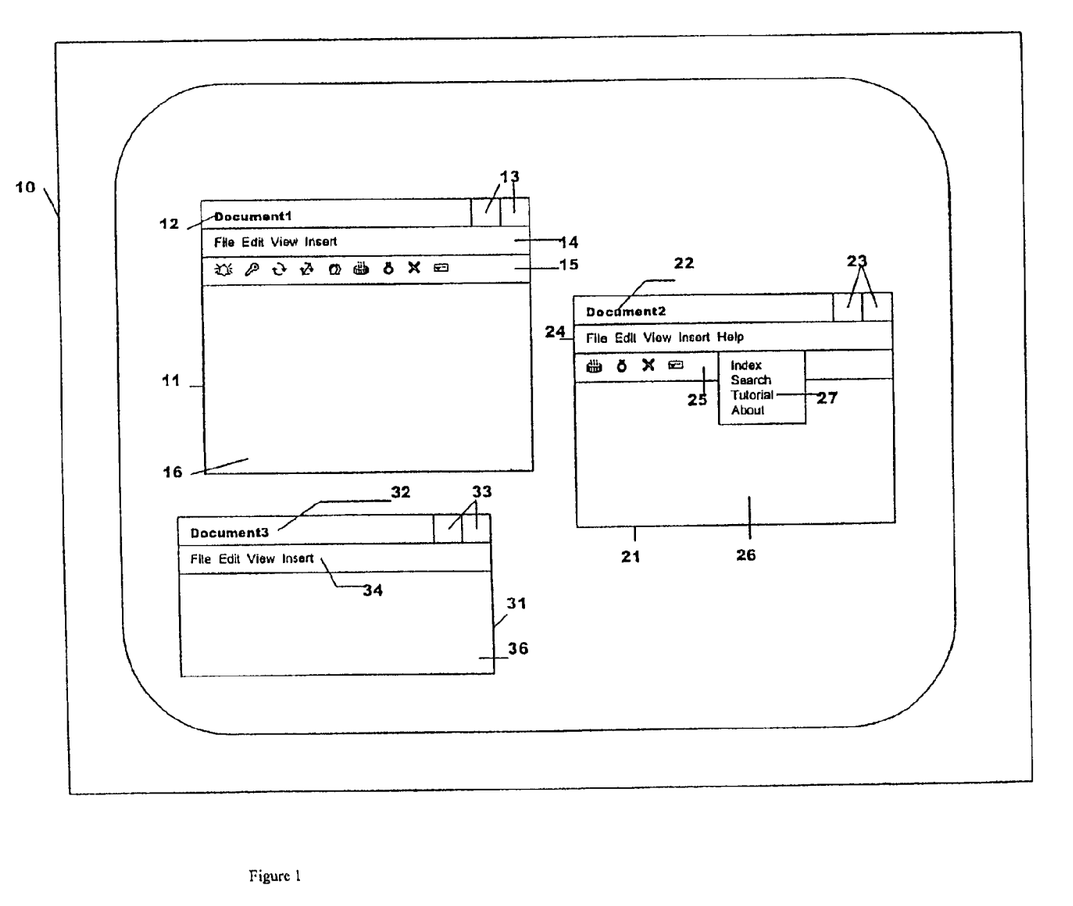
FIG. 1 depicts an SDI environment according to the present invention.

Referring to FIG. 1, there is shown a user interface according to an embodiment of the present invention in Single Window Mode. A computer display 10 contains a number of views in their own top level windows. A frame 11 contains a view 16 with a title bar 12, a menu bar 14 and a toolbar 15. Buttons 13 for sizing (maximizing, minimizing) and closing the view are provided in the corner of the frame 11. The toolbar 15 contains a number of icons, each representing some executable action for the application in the frame 11, usually providing a short cut to some of the actions available under the menubar 14 for that same application.

Another view 26 is contained in frame 21, with its respective title bar 22, menubar 24, toolbar 25, and sizing and closing icons 23. Clicking on a selection in the menu bar 24, and in any menu bar for that matter, causes a corresponding pull-down menu to be displayed. For example, clicking on "Help" in the menu bar 24 displays a pull-down menu 27 with the available actions related to "Help."

The third frame 31 in the display 10 has a menubar 34, but no toolbar. The title bar 32, sizing and closing icons 33 and the view 36 are usually the minimum components of a top-level window in this mode.

Figure 2:
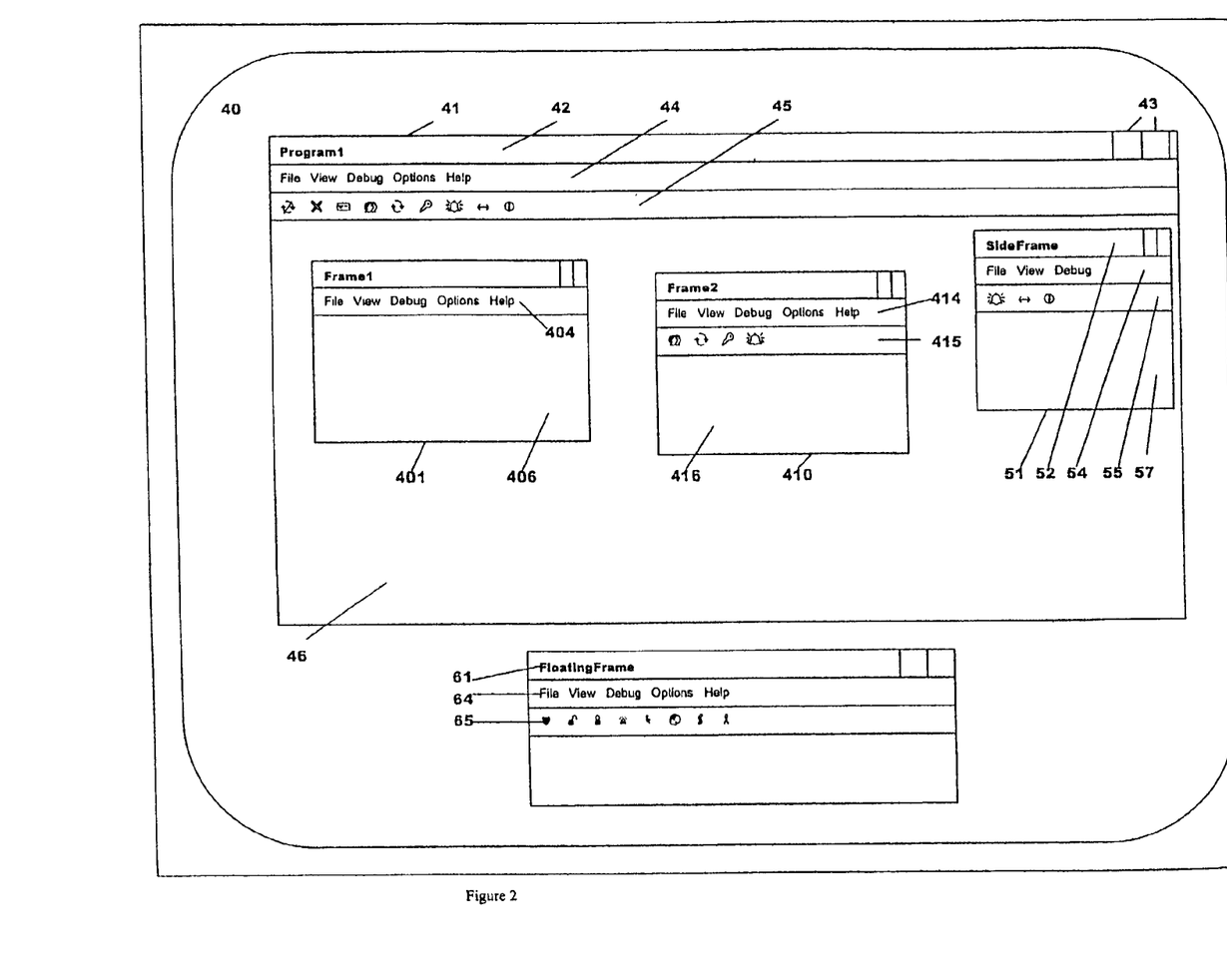
FIG. 2 depicts an MDI environment according to an alternative embodiment of the present invention.

FIG. 2 shows a computer display 40 with a user interface according to an embodiment of the present invention in Desktop Mode. The main top-level desktop window 41 contains the views for the development of a project on the computer. The main window 41 is a parent frame with a title bar 42, menubar 44 and toolbar 45. The view 46 includes two windows 401 and 410. The window 401 has a menubar 404, but no toolbar The other window 410 in the main window 41 has a menubar 414 and toolbar 415 with its corresponding view 416.

In this mode, views can be docked on the side of the main view 41, like view 57 in the side frame 51 with its own title bar 52, menubar 54 and toolbar 55. Views may also be floating in their own separate window outside the main desktop, like the window "FloatingFrame" 61, or be floating within the main view 41, like views 401 and 410.

The toolbar 45 of the main-level window 41 has the executable tool bar actions of all the views merged together, except for the icons of the floating frame 61. The toolbar 65 of the floating frame 61 is designated as internal to the frame 61 so that the icons of its toolbar 65 are not merged into the main frame toolbar 45. Therefore, the icons in the Floating-Frame do not appear in the main window tool bar 45. The same may be done for the menu bars of the other frames, depending on user preferences. Moreover, as the menubar 44 and toolbar 45 contain the merged functionality of views 406, 416, and 57, menu bars 404, 414, and 54 and toolbars 404, 415, and 55 may be omitted as illustrated below with regard to FIG. 4.

The system is implemented with software, preferably coded in an object-oriented programming (OOP) language, such as Java®. As one reasonably skilled in the art will appreciate, Java allows the user to define data types, known as classes. In addition, Java provides a library of GUI controls called Swing objects, including for example, JFrame, JInternalFrame, JButton, JToolbar and the like. An object is an instance of a class.

Within the system, there are two aspects of an object: its visual component that is displayed on a computer screen and; its source code (program) that resides in memory and is executable by a processor to create the visual component.

The system of FIGS. 1 and 2 uses a generic frame, like a blank template, to create on-screen objects. By providing a template, code for creating the common features of every window will not have to be re-written for each and every window. Rather, only the unique parts of a window need to be created to add a new GUI component to the system.

A class of generic frames is preferably provided, which can, for example, be the Java Swing component JFrame, that defines windows with a title bar, menu bar and tool bar. To create a generic child frame within JFrame, a sub-class is created, which may be the called JInternalFrame. A subclass within JInternalFrame may also be included, one for each type of layout. Assuming there is only one type, for simplicity, JTabbedPane can be the name given to a subclass of JInternalFrame to define a child component of JInternalFrame in a tabbed format.

Different classes are also provided for each type of container component, for example, an MDIFrameContainer class for the top-level frame in MDI mode, a SingleComponentContainer class for containers that hold a single component, and a TabbedFrameContainer class for container components with a tabbed layout in its view. An instance (object) of MDIFrameContainer can be called MDIContainer, and an instance of the TabbedFrameContainer class can be called TabbedContainer. The MDIContainer contains source code for configuring the particulars of the actual displayed GUI such as the title for the title bar, the options and pull-down menus in the menu bar, the icons for the toolbar, and any other particulars of the window.

The actual on-screen appearance and hierarchy is determined by the software architecture of the objects, i.e., how the objects reference each other. For example, assume a top-level window is desired in an MDI environment with one tabbed container component having two tab views as children. By referencing JFrame, which defines a top-level window, MDIContainer will be configured and displayed as a top-level window. TabbedContainer will reference JInternalFrame so that it will be displayed as a child of, and internal to, the MDIContainer. Assuming two view components, TableTab and TreeTab, are to be added as children of the TabbedContainer, they would reference the JTabbedPane and each would be configured as a tab of the view in TabbedContainer.

If a different layout were desired, then the view components would reference another container type, if one were available. If a SingleComponentContainer were to be included in the TabbedContainer rather than a view component, the SingleComponentContainer would be instantiated as a child of TabbedContainer and would reference JTabbedPane so that the resulting visual component would be a third tab in JTabbedPane. If instead an MDI container were included as a child of TabbedContainer, it would reference JTabbedPane (because it is a child of TabbedContainer) and the resulting visual component would be a third tab in JTabbedPane, which itself would be an MDIContainer. If a container component were then instantiated as a child of MDIContainer, it would be displayed as a JInternalFrame (because it is a child of MDIContainer) within the third tab in JTabbedPane.

Figure 3:
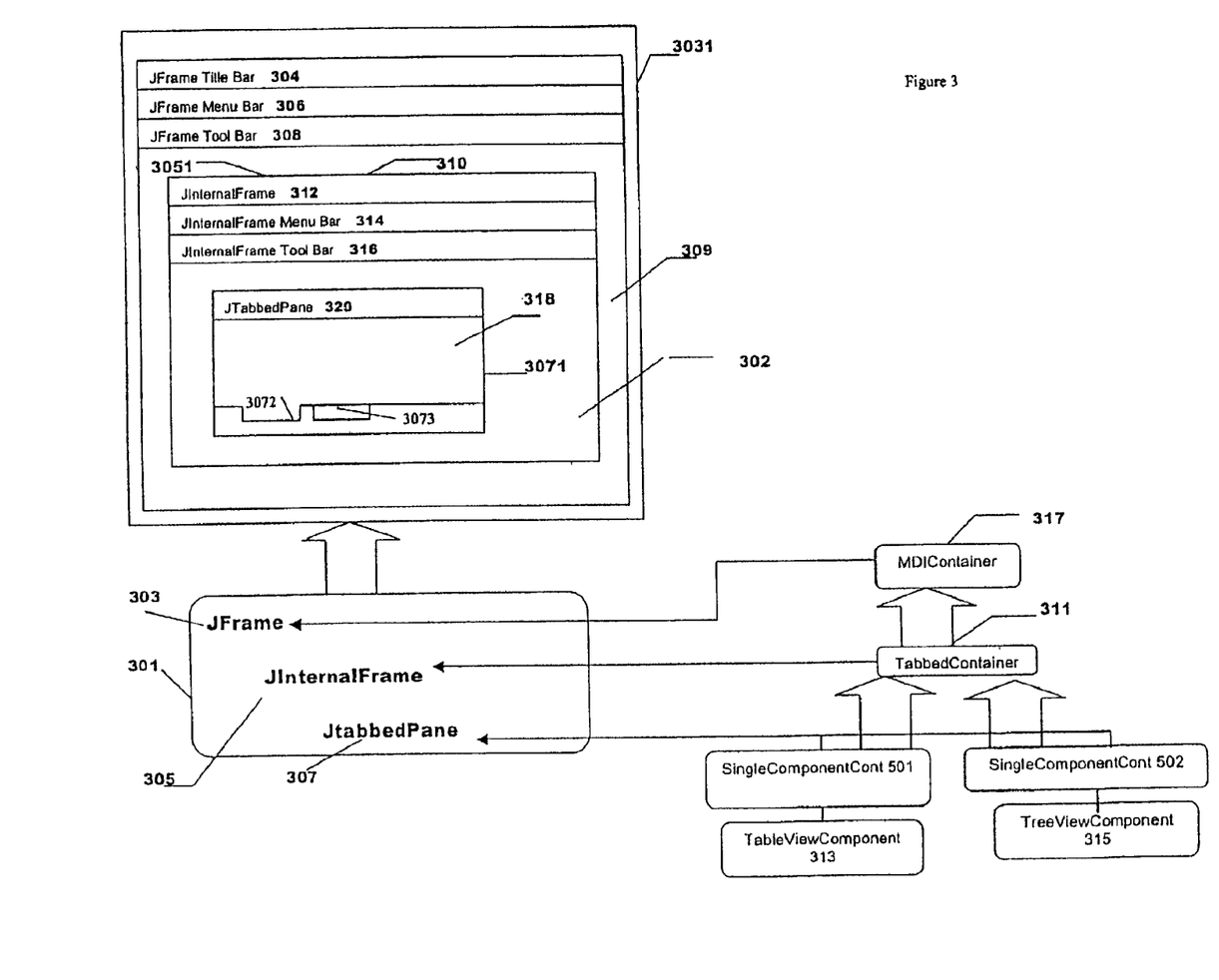
FIG. 3 depicts a generic frame component according to the present invention with its corresponding software architecture.

Referring to FIG. 3, a blank, generic on-screen frame 3031 is shown with graphical representations of its corresponding code 301. The code 301 for a generic frame contains the JFrame code 303, JInternalFrame code 305 and the JTabbedPane code 307 discussed above. The corresponding on-screen object 3031 for JFrame 303 has a blank title bar 304, menu bar 306 and tool bar 308. The view 309 of the JFrame 3031 contains the on-screen object 3051 of JInternalFrame code 305. The JInternalFrame on-screen object 3051 has its own title bar 312, menu bar 314 and tool bar 316. In its view 302, the JInternalFrame 3051 has a JTabbedPane 3071 which is the on-screen object of the JTabbedPane code 307. The JTabbedPane on-screen object 3071 has only a title bar 320 and a view 318 configured in a tabbed layout.

When the object MDIContainer 317 references JFrame 303, the TabbedContainer 311 (as a child of MDIContainer 317) references JInternalFrame 305. View component TableViewComponent 313 is a sole child of SingleComponentContainer 501 and TreeViewComponent 315 is a sole child of SingleComponentContainer 502. SingleComponentContainers 501 and 501, as children of TabbedContainer 311, reference the JTabbedPane 307.

A frame management system according to a preferred embodiment of the present invention preferably exists in a software architecture that separates user-interface component specifications, thereby allowing the independent development and integration of the user-interface component of an application. An example of such an architecture is the client component architecture (CCA) system disclosed in the co-pending application U.S. application Ser. No. 09/771,244, filed Jan. 26, 2002, entitled "Event Mediator for Facilitating Communication Between Isolated Components in an Integrated Development Environment," hereby incorporated by reference in its entirety.

As discussed above, the basic unit of the frame management system is the component, which can be used as a container to hold the user-interface components (menu bars, tool bars and views) of a window as well as holding other components (child components). When a component contains another component it is known as a container component. Via their associated frames, container components display their child components (which may also be further container components) according to a certain layout, e.g., tiled or tabbed defined by their container component type (e.g., SplitPaneContainer, TabbedContainer, etc.). For example, an MDIContainer might have a TabbedContainer as a child. One the other hand, there is the on-screen hierarchy of Swing objects in which an MDI desktop (i.e. JDesktopPane) contains a JInternalFrame that contains a JTabbedPane. Therefore, the container components also play a role as an on-screen object: an MDIContainer lays out its children as an MDI desktop (a JDeskTopPane) and a TabbedContainer lays out its children as a JTabbedPane. Each container component is both an element in the software hierarchy of container components and view components, and in the on-screen hierarchy of Swing objects. As such, in its role as an on-screen object, the MDIContainer can contain "frames" (JInternalFrame) that contain its child components, such as a TabbedContainer.

Components provide input/output functionality in different ways, for example, by view or dialog. A view component displays the information of a particular application and provides an area where a user enters data and executes action on that data. An example would be typing in a document via the view of a word processor GUI and then editing it. A dialog component prompts the user for input before carrying out some action. An example would be a dialog window that asks a user if they want to save the edits they made on a document before exiting the application. A "yes" box and a "no" box are provided that may be clicked to select the appropriate answer. A dialog component would be an instance of a JDialog class, for example.

In a preferred embodiment of the present invention, each component is associated with a CCAFrame, a coded object that provides the bridge between the component and an instance of the generic frame object, like JFrame, embodying an on-screen object that optionally may have a title area, menubar and toolbars. In this regard, CCAFrame is a Java interface that is implemented by a number of objects such as GenericJframe, GenericJInternalFrame, GenericTabFrame and so on. Each of these objects is essentially a wrapper for a corresponding type of Swing frame object. For example, GenericJFrame (which implements CCAFrame) is a wrapper for Swing's Jframe. It is in this sense that the CCAFrame provides a bridge between a container component and its associated generic frame object.

Any particular frame object acts as a graphical decoration for its associated container component, providing certain functions, such as display of that container component's title, display of the Swing menubar and toolbars instantiated for that container component's merged menu and toolbar structures, and perhaps providing user interface objects such as 'close' and 'iconify' buttons. Different types of frame objects carry out these functions in different ways. For example, a JFrame displays a title bar showing the container component's title, whereas a tab of a JTabbedPane shows the container component's title on the tab. However, whatever the actual frame object associated with the container component, the container component and frame manager only interact with this object through the CCAFrame interface, which contains methods such as setTitle( ), setIcon( ), setMenuBar( ), setBounds( ), getBounds( ) and the like. In this manner, the interaction of a container component with its frame object is completely independent of what that frame object actually is (this being determined by the container component's position in the containment hierarchy, in particular the type of its parent container component). If instead, the container component were to hold an explicit reference to its frame object, it could not do this, as different Swing frame objects (such as JFrame and JInternal Frame) do not have these shared generic methods.

Components and generic frame objects reside in parallel hierarchies with a bridge between them formed by the CCAFrames associated with each component. The actual Java Swing object represented by the generic frame is determined by a component's parent. For example, the MDIFrameContainer of FIG. 3 had its child frame component (TabbedContainer) associated with JInternalFrame, displayed in the desktop area as a child of JFrame. So the actual swing frame object that is associated with object TabbedContainer (JInternal frame) via its CCA frame is determined by TabbedContainer's parent, MDIContainer. It should be noted that the generic frame object associated with a container component is subject to change: if a container component were dragged to a different parent, its frame object could possibly be different.

The CCAFrame is also responsible for tracking the merged menu and toolbar structures for the container component and its children. As explained in more detail below, any container component that requires a menubar references the MenuContainer object in which merging takes place.

The MenuBar and JToolBar Swing objects instantiated from the merged structure are forwarded to the container component's associated frame object for display. This is done via methods in the CCAFrame interface (e.g., setMenuBar( ), setToolBars ( )). Different types of frame objects may actually display menubars and toolbars in different ways.

Each container component type implements a different layout policy that governs the actual on-screen arrangement of its child components. Exemplary layouts include tabbed and tiled layouts that arrange child components in configurable tabbed and tiled displays, and MDI layouts that arrange components and child components in a 'desktop'. The layout defined by the container component type determines how new view components added to the container component will be displayed and the user can dynamically change the layout of components on a display. For example, a tiled layout of user-interface components can be recast as a tabbed layout. Certain layouts have associated classes used to display user-interface components. (MDI layout preferably has classes for 'internal' and 'docked' windows to provide both frames floating within the main top-level window and frames docked to the side of the main top-level window.) Examples of container component types and suggested naming conventions include:

MDIFrameContainer: In this layout type, a central 'desktop' area is provided in which components appear in desktop sub-windows, surrounded by an area in which components may be docked against the edges of the container component in docked sub-windows. This is an MDI (multiple document interface) layout that is similar in appearance to the main IDE window in Wind River Systems' Tornado AE product.

SplitPaneContainer: In this layout type, components are tiled within the layout, filling the available space. The separators between frame components may be dragged to resize the constituent components.

TabbedContainer: In this layout type, each component is displayed on a separate tab. The contents of only one tab are visible at any one time.

BorderLayoutContainer: In this layout type, a central component is optionally surrounded by components located at the 'North', 'South', 'East' and 'West' borders of the container component. This layout type is similar AWT's (Abstract Window Toolkit) BorderLayout.

SingleComponentContainer: In this layout type, a single child component is displayed within the layout, filling all the available area. This layout is an SDI (single document interface) layout.

Within the system according to the preferred embodiment of the present invention, any component may be moved to a different location within its parent, to a different parent, or to a new hierarchy. A generic FrameDragger class provides this functionality by interacting with the container components to indicate, to the user, how the moved component will appear at its new position.

A given environment includes one or more hierarchies of components. At the top of each hierarchy, the head frame container component is displayed in a native operating system window (its frame object being a JFrame or JDialog as appropriate). At each level of the hierarchy below, container components layout their frame components; at the bottom of the hierarchy are container components that are either empty (making it a frame component) or contain a view or dialog component.

Figure 4:
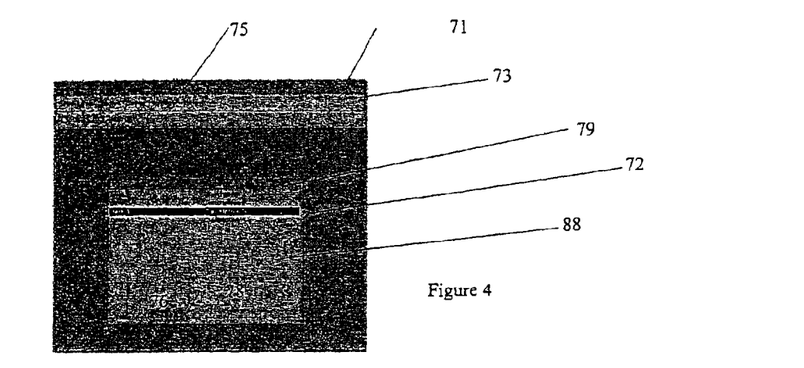
FIG. 4 illustrates another MDI environment displayed on a display screen.

Referring to FIG. 4, and using the exemplary terminology described above, there is shown an MDIContainer 70 with a title bar 71, menubar 73, and toolbar 75. MDIContainer 70 has a single child frame component 72, which is a TabbedContainer. TabbedContainer 72 has a title bar 79 and no menubar or toolbar. TabbedContainer72 has two children, TableView 76 and TreeView 78, each of which is implemented as a SingleComponentContainer (74, 74') with one child, a view component (76', 78'). The on-screen object for the view component of TableView 76 is the view 88 with a list of items and their corresponding descriptions. The view component for TreeView is behind the view 88 and will become visible if it is selected, bringing the TreeView 78 tab in front of TableView 76.

Figure 5:
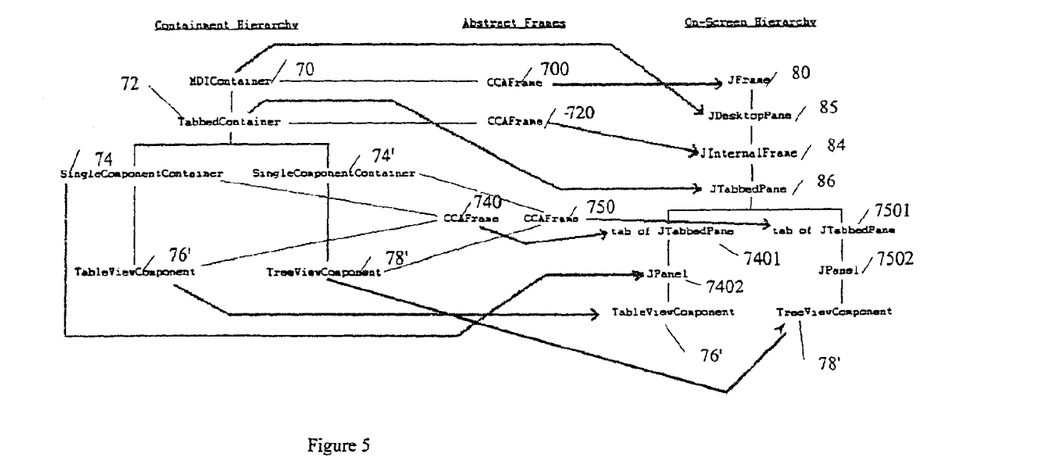
FIG. 5 depicts a detailed software architecture for implementing the display of FIG. 4.

A detailed software architecture for the view of FIG. 4 is depicted in FIG. 5. The MDIContainer 70 is associated with a CCAFrame 700 whose generic frame is a JFrame 80 having a menubar and toolbars. The CCAFrame 720 for the TabbedContainer 72 references the JInternalFrame 84 residing in a JDesktopPane 85 of the JFrame 80. The SingleComponentContainer 74 for the TableView component 76' is associated with a CCAFrame 740 whose generic frame object 7401 is a tab of the JTabbedPane 86 within the content pane of JInternalframe 84. The SingleComponentContainer 74' for the TreeView component 78' is associated with CCAFrame 750, whose generic frame object 7501 is a tab of the JTabbedPane 86 within the content pane of JInternalFrame 84 in the JFrame 80. The TableView component 76' is displayed on-screen within a JPanel 7402 of tab 7401, as shown in FIG. 4. The TreeView component 78' is similarly displayed on screen within a JPanel 7502 of the tab 7501.

Each container component type (e.g., MDIContainer, TabbedContainer, etc.) implements its own generic Java interface to interact with the generic frame management code. With this architecture, it is easy to add new types of container components with their own type-specific interface. Other examples of objects implementing the generic frame interface range from JFrames and JDialogs, to objects that might only have a title area, such as a single tab of a JTabbedPane.

Objects representing on-screen windows, like JFrame, also implement a generic frame object interface (e.g., GenericJFrame) to interact with the frame manager and container components. In this way, the class responsible for drag and drop between container components interacts with the container components via their interface. As a result, the specification of the container components and container component types that appear in a certain IDE is independent of the operation of the generic frame management system itself.

The system preferably uses a policy-based approach to configuring menus and toolbars, so that menus and toolbars from different components are merged automatically according to specific, predetermined policies that are stored in a data file which will be referred to herein as a properties file. A respective properties file is provided for each view component. A further explanation of how policy-based configuration operates can be found in co-pending U.S. application Ser. No. 09/770,320, filed Jan. 26, 2001 and entitled "State and Data Driven Dynamic Menu and Toolbar Architecture", the entire disclosure of which is hereby incorporated by reference. As a result of the policy-based approach, component menus and toolbars can be placed at any level in the containment hierarchy according to a user's preference, and are automatically merged with the menus and toolbars already existing at the selected level.

Each application in the system has associated executable actions represented by toolbar buttons and menu items. The user can choose to place the toolbars and menus associated with a application at any level in the containment hierarchy.

For example, suppose a parent container component (e.g., an MDIContainer) contains a child container component (e.g. SplitPaneContainer) having a view component. The menu bars and tool bars for the view component may be placed in the menu bar and tool bar space of the child container component, or in the menu bar and tool bar space of the parent container component. The system maintains a MenuContainer object for managing the placement of menu bars and a ToolbarContainer object for managing the placement of toolbars. The MenuContainer object conducts policy-based merging of menus over an arbitrary number of abstract menubars, and the ToolBarContainer object conducts policy-based merging of toolbars over an arbitrary number of abstract toolbars. In this regard, the MenuConainer maintains an "abstract" menubar for each existing container component. Any container component that requires a menubar references its respective abstract menubar within the MenuContainer object. If the container component has children whose menus should be merged into this menubar (eg. in an MDI environment), it is within this particular abstract menubar within the MenuContainer object that policy-based merging of these component's menu descriptions takes place. The ToolbarContainer is implemented in a similar manner. The actual Swing JMenuBar and JToolBar objects are instantiated from the respective abstract menubar and toolbar for the container component within the MenubarContainer and ToolbarContainer objects and are displayed in the frame corresponding to the container component.

A properties file includes information about the configuration and appearance of menubars and toolbars. Table 1 shows a portion of an exemplary properties file which implements the menu elements of frame 21 in FIG. 1 and defines some of their policies.

TABLE 1

Exemplary properties file.

```
 1 menubar = file edit view insert help
 2 file = print save open
 3 edit = cut copy paste
 4 view = graphics codes
 5 insert = page date
 6 help = index search tutorial about
 7 fileLabel = File
 8 editLabel = Edit
 9 viewLabel = View
10 insertLabel = Insert
11 helpLabel = Help
12 printLabel = Print
13 printImage = printer.gif
14 .
15 .
16 .
17 tutorialLabel = Tutorial
18 aboutLabel = About
19
20 fileMDIPolicy = Merge
21 editMDIPolicy = Replace
22 viewMDIPolicy = Merge
23 insertMDIPolicy = Persist
24 helpMDIPolicy = Persist
```

The first line of Table 1 identifies the headings in the menubar and lines 2–6 identify the contents under each heading. Lines 7–18 define the on-screen name, or label, for each menubar heading as it will appear on the display. The on-screen name can be in the form of text e.g. FileLabel=File) or in the form of an image (e.g., PrintImage=printer.gif).

Lines 20–24 identify the policies for each menu option. Those headings with a "Replace" policy will be replaced when a frame is added as a child by certain of the child frame's menubar options. A "Persist" policy will keep the heading on the menubar, and a "Merge" policy causes the options under a heading to be added to a corresponding heading of the child frame.

In the preferred embodiment of the present invention, a container component contains a number of view and dialog components as descendants in its container component hierarchy. As already mentioned, the container component is associated with a CCAFrame that provides the bridge to an on-screen frame object that optionally has a menu bar and toolbars. Policy-based merging of descendant component menus and toolbars may potentially occur at any level in the containment hierarchy. For example, a container component may choose to pass the menu and toolbar description of its descendant components further up the hierarchy. In FIG. 4 for example, all component menus and toolbars are merged at the top-level of the hierarchy, in the MDIContainer 70. A container component may also choose to pass its menu and toolbar descriptions to another container component altogether (for example, the component menus and toolbars of a floating window in a desktop environment may appear in the main IDE window).

Each container component references the MenuContainer and ToolBarContainer objects which perform policy-based merging of menu and toolbar descriptions over an arbitrary number of menubars and toolbars. The JMenuBar and JToolBars instantiated from the merging of the menu bar and toolbar descriptions of the container component's descendant components are forwarded to the container component's associated frame object for display via the CCAFrame interface. Using the previous example of FIG. 3, the menu and toolbars instantiated for the MDIFrameContainer 70 when it is opened, are forwarded to its generic frame object, namely, the JFrame 80. Focus changes between descendant components are automatically handled with updates to the appropriate menus and toolbars, as are the potential addition and removal of menus when descendant components are moved to another parent.

In a particularly preferred embodiment of the present invention, the components communicate via a component mediator that submits requests to the frame manager to determine how the components appear in windows on a display. In such an architecture, the components have no knowledge of the frame management system functionality. Components in the system, when coded in Java, can be defined by a source file and a text property file that defines many of the read-only aspects of the component's user-interface. As described above, the property file defines the component's menus and toolbars as well as the policies that determine how the component will merge with the menus and toolbars of other components.

Preferably, the frame manager has overall responsibility for tracking the set of all hierarchies, adding and removing elements from hierarchies, moving elements between hierarchies and handling component mediator requests to:

create frame components either by appropriately adding them to an existing hierarchy or creating a new hierarchy;

destroy frame components by removing the associated structures from a hierarchy and saving the state of layouts;

to appropriately alter the z-axis order of windows when a certain component in the hierarchy needs to be brought to the front (for example, if it is cross-referenced by another component); and to alter the state of windows or components (for example, to minimize or restore them).

In addition, the frame manager maintains a list of available container components.

Preferably, the frame manager has overall responsibility for tracking the extant container component hierarchies. When receiving requests to create or destroy components, it will interact with container components to add or remove components, possibly creating or destroying container component hierarchies. It will alter the state of components, frames and hierarchies (for example, iconizing, maximizing or restoring to their original size) and is able recreate or store container component or hierarchy states.

A ContainerState object encodes sufficient information about the state of its frame components (e.g. component location within the container component and component type) to recreate a desired layout. It should be noted that the ContainerState object holds information both about extant container component children and container component children that have been dismissed. By recursing through container state hierarchies in specific ContainerState objects, the frame manager can record the state of the entire environment. Upon requests from the component mediator, the frame manager will recreate layouts stored in ContainerState objects. When requested to show a view or dialog component, the Frame manager can use container state information in conjunction with the extant container components to correctly place the component within a hierarchy.

Figure 6A:
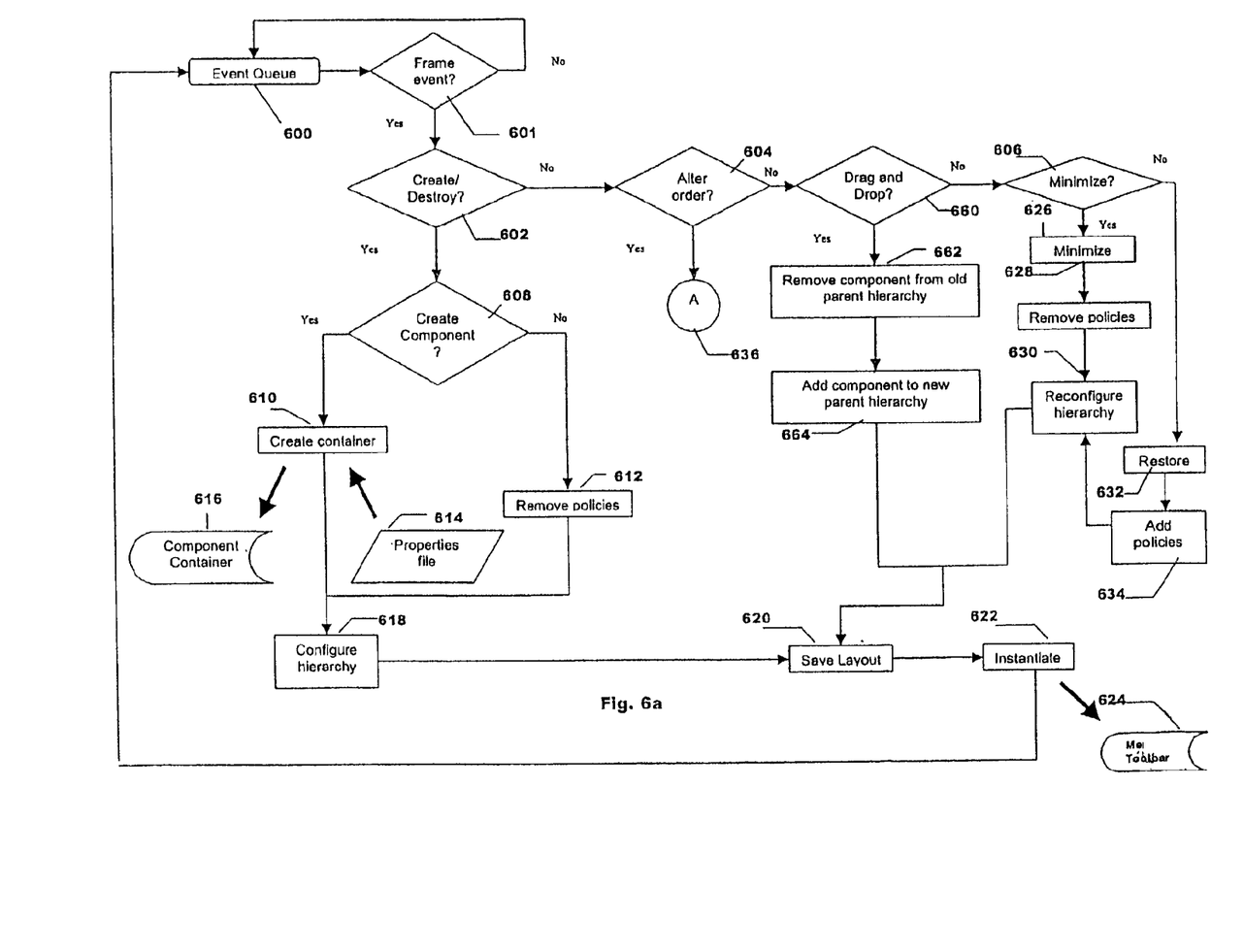
FIG. 6a is a flowchart for a preferred frame manager according to an embodiment of the present invention.

FIG. 6(a) shows an exemplary flow chart for a frame manager according to an embodiment of the present invention. At step 600, the frame manager monitors a current event on its event queue, and determines whether the event, e.g., a user action or a message sent from another processing device (such as a CCAFrame), is a frame event (step 601). In this regard, a frame event can be a frame create event frame destroy event, drag and drop event, alter frame order event, or alter frame state event. If it is not a frame event in the queue, the frame manager proceeds to the next event in the queue (step 600) until a frame event is found (step 601).

If the event is a frame event (step 601), the frame manager determines if it involves creating or destroying a frame (step 602). If it does, the frame manager determines if it is a create frame event or a destroy frame event (step 608). If the event is a create frame event, a container component is created (step 610) by submitting a request to its associated CCAFrame, reading one or more policies from a properties file 614, and integrating the policies into a container component 616. After the frame is created, it is placed into its appropriate hierarchy in its proper designated position, or an entirely new hierarchy is created if necessary (step 618). The resulting layout is saved (step 620) and the new menu bar and tool bars 624 are instantiated (step 622) based on the policies of the active applications, including that of the created frame. After instantiation, control is returned to the event queue 600.

To add and remove user-interface components and child frames as discussed above, the frame manager submits requests to the container component that holds references to the MenuContainer and ToolBarContainer objects which in turn, perform policy-based merging of menu and toolbar descriptions over any number of menubars and toolbars.

If the frame event is not a create or destroy frame event, the frame manager proceeds to determine if it is an alter order event (step 604), requiring a change in focus and reorganization of an existing hierarchy (step 636), the process of which is discussed later.

Assuming the frame event is not an alter order event, the system determines whether the event is a drag-and-drop request (step 660). If it is not, then the only possibility left is an alter state event. In this embodiment, altering states includes minimizing (reducing the GUI to an icon) and restoring (changing the GUI from an icon back to its full size before minimizing). At step 606, the frame manager queries whether the alter state event is a minimize event. If it is, the frame manager minimizes the specified window (step 626), preferably by calling a function to do so, removes the policies of the minimized window (step 628) and reconfigures the hierarchy (step 630) to remove the minimized window. The resulting layout is saved (step 620) to the ContainerState object and the new menu bars and tool bars 624 instantiated (step 622) before returning control to the event queue 600.

If the alter states event is not a minimize event (step 606), then it follows that a restore event has been requested. The specified window is restored to its original size (step 632) and its policies applied to the display (step 634). The hierarchy of the container components is reconfigured to include the restored window (step 630) and the new layout saved (step 620) in ContainerState. The policies of the restored window are instantiated (step 622) to create new menu bars and tool bars 624 and control is returned to the event queue 600. A maximize event can be implemented by following the same steps as a restore event, and maximizing the window to take up the entire screen (rather than restoring the window to its previous size).

If the event is a drag and drop request (step 660), the dragged component is removed from its old parent hierarchy (step 662) and added to its new parent hierarchy (step 664). This move is accomplished by requesting the component to change its referenced parent container component.

Subject to constraints specified for the particular environment the user can drag and drop components between container components. If appropriate, a container component may display its children such that the user can click on a component and drag it within the container component or to another container component. A container component that may hold multiple children should contain an area such that dragging a component over this area will add it to the container component. Drag and drop is carried out by a FrameDragger function. While dragging a component, the frame dragger preferably displays a frame outline on the screen indicating where the component sill be placed if dropped by obtaining the required information from the frame manager and the individual container components. When the component is dropped, the frame manager will remove the component from its old parent and add it to the new (note that the old and new parents may be the same if the user is simply moving a component within its container component).

When this functionality is implemented in Java, the drag and drop of a top level frame container component should be handled slightly differently as there is no access within Java to mouse events occurring in the title bar or frame of native operating system windows. To address this, the JFrame and JDialog classes can be extended to provide the facility to drag their contents to another frame container component.

Figure 6B:
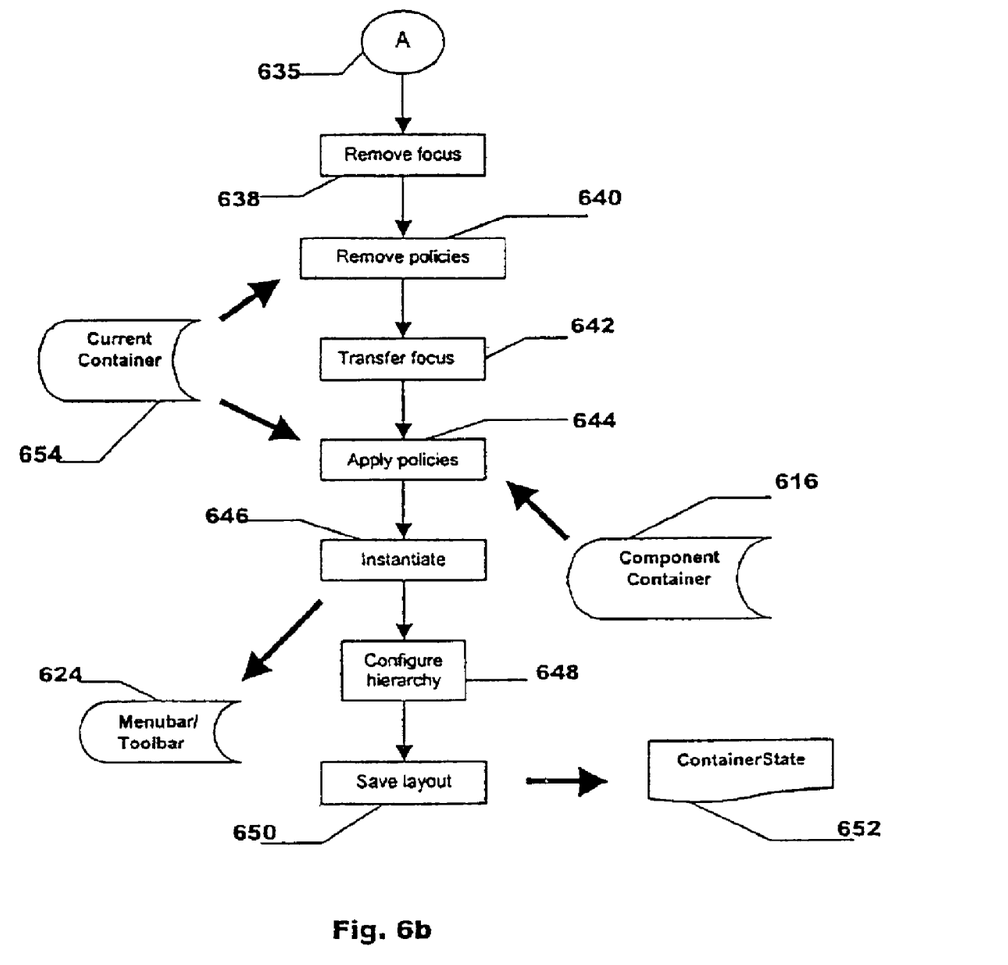

FIG. 6b is the flowchart for handling the alter order event of FIG. 6a (step 636 of FIG. 6). This type of event may, for example, occur when a window without focus is clicked, transferring focus to that element, bringing it to the top of the hierarchy in a particular frame container component and displaying it in front of the other components in a display.

To bring a particular window to the top of a hierarchy, focus is first removed from the window currently at the top of a container component hierarchy (step 638) and its policies removed (step 640) from the current container component 644. Focus is transferred to the particular element being placed on the top of the hierarchy (step 642) and the policies of the new top-level window applied (step 644) to its container component 654. Menu bars and tool bars 624 are instantiated (step 646) and the hierarchy of the container component is configured (step 648) with the new top-level window placed at the top of the hierarchy. This new hierarchy and layout is saved (step 650) to a ContainerState object 652.

As noted, each container component is associated with a ContainerState object that encodes sufficient information about the state of its components (e.g. component location within the container component and component type) to recreate the layout and the container state holds information both about extant container component children and those that have been dismissed.

It should be noted that since the frame management systems described above may work with a multiple development environment, certain restrictions on configurability can be specified. For example, in a particular environment, it may be appropriate to limit the depth of the container component hierarchy to a certain number of levels.

In any particular environment there will be a set of properties that constrain the behavior of the frame management system. Together with the states of container components within the environment, these constraints effectively define the environment. Examples of such constraints are:

- types of container components available
- default container component type for new container components
- specification of container components always present
- possible location of menus and toolbars within hierarchies
- restrictions on drag and drop between container components
- maximum depth of container component hierarchy In the preferred embodiment of the present invention, constraint options are passed to the frame manager on initialization. One set of constraints might define a 'Desktop' mode, while another might define a 'Single Window' mode. The frame manager can be reinitialized with different constraint options at a later time, to alter its mode of operation. In this case, the frame manager will appropriately recreate its container component hierarchies, for example, when switching from a 'Desktop' to 'Single Window' mode. The system automatically saves and restores component configurations between invocations of the IDE. In addition, the structure of a particular configuration can be saved and opened in another context. For example, a context could be a project and the configuration could define the layout of project management components, source editor components, and debugging components that a user requires for a project. Further, the framework can accommodate new container component types as required.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for displaying a graphical user interface comprising the steps of:
   providing a plurality of generic frame objects in a hierarchical tree,
   providing a plurality of container components, each of the plurality of container components defining a respective menu/toolbar layout;
   associating a first one of the plurality of container components with a first one of the plurality of generic frame objects;
   displaying a frame on a display, wherein a position of the frame and the menu/toolbar layout of the frame is a function of the first one of the plurality of container components, the first one of the plurality of generic frame objects, and any ancestor object of the first one of the plurality of generic frame objects;
   in response to an event,
      disassociating the first one of the plurality of container components from the first one of the plurality of generic frame objects, and
      associating the first one of the plurality of container components with a second one of the plurality of generic frame objects; and
   displaying the frame on the display, wherein a position of the frame and the menu/toolbar layout of the frame is a function of the first one of the plurality of container components, the second one of the plurality of generic frame objects, and any ancestor object of the second one of the plurality of generic frame objects.

2. A method for displaying a graphical user interface comprising the steps of:
   providing a plurality of generic frame objects in a hierarchy,
   providing a plurality of container components, each of the plurality of container components defining a respective menu/toolbar layout;
   providing a component;
   associating the component with a first one of the plurality of container components, and associating the first one of the plurality of container components with a first one of the plurality of generic frame objects;
   displaying the component in a frame on a display, wherein a position of the frame and the menu/toolbar layout of the frame is a function of the first one of the plurality of container components, the first one of the plurality of generic frame objects, and any ancestor object of the first one of the plurality of generic frame objects;
   in response to an event,
      disassociating the first one of the plurality of container components from the first one of the plurality of generic frame objects, and
      associating the first one of the plurality of container components with a second one of the plurality of generic frame objects; and
   displaying the component in the frame on the display, wherein a position of the frame and the menu/toolbar layout of the frame is a function of the first one of the plurality of container components, the second one of the plurality of generic frame objects, and any ancestor object of the second one of the plurality of generic frame objects.

3. The method of claim 1, wherein the hierarchical tree includes a first hierarchical tree and a separate, second hierarchical tree.

4. A method for displaying a graphical user interface comprising the steps of:
   providing a plurality of generic frame objects in a hierarchical tree,
   providing a plurality of container components, each of the plurality of container components defining a respective menu/toolbar layout;

associating a first one of the plurality of container components with a first one of the plurality of generic frame objects;

displaying a frame on a display, wherein a position of the frame and the menu/toolbar layout of the frame is a function of the first one of the plurality of container components, the first one of the plurality of generic frame objects, and any ancestor object of the first one of the plurality of generic frame objects;

in response to an event, disassociating the first one of the plurality of container components from the first one of the plurality of generic frame objects, and associating the first one of the plurality of container components with a second one of the plurality of generic frame objects; and displaying the frame on the display, wherein a position of the frame and the menu/toolbar layout of the frame is a function of the first one of the plurality of container components, the second one of the plurality of generic frame objects, and any ancestor object of the second one of the plurality of generic frame objects, wherein the plurality of generic frame objects include one or more of a Java JFrame object, a Java JTabbed object, and a Java JPane object.

5. The method of claim 1, wherein the plurality of container components include one or more of an SDI container object and an MDI container object, the SDI container object defining a single document interface environment where a number of views are configured with each view having a corresponding menu bar and/or a corresponding tool bar, the MDI container object defining a multiple document interface where a parent view and a number of child views are configured, and wherein a common menu bar and/or common tool bar is provided for the parent view and the number of child views.

6. The method of claim 2, further comprising providing a data file for the component, the data file including information indicative of a policy for at least one menu/toolbar entity displayed in the frame.

7. The method of claim 6, wherein the component comprises a plurality of view components, each having a respective data file.

8. A method of displaying a graphical user interface comprising the steps of:

providing a plurality of components including an SDI container object and an MDI container object, the SDI container object defining a single document interface environment where a number of views are configured with each view having a corresponding menu bar and/or a corresponding tool bar, the MDI container object defining a multiple document interface where a parent view and a number of child views are configured, and wherein a common menu bar and/or common tool bar is provided for the parent view and the number of child views;

providing a plurality of generic frame objects, the generic frame objects including a tabbed frame object, an internal frame object, and a frame object;

providing a component;

associating the component with a first one of the plurality of components, and associating the first one of the plurality of components with a first one of the plurality of generic frame objects;

displaying the component in a frame on a display, wherein a position of the frame and the menu/toolbar layout of the frame is a function of the first one of the plurality of components and the first one of the plurality of generic frame objects;

in response to an event, disassociating the component from the first one of the plurality of components, and associating the component with a second one of the plurality of components, the second one of the plurality of components being associated with one of the plurality of generic frame objects; and displaying the component in the frame on the display, wherein a position of the frame and the menu/toolbar layout of the frame is a function of the second one of the plurality of components and the one of the plurality of generic frame objects.

9. A method for displaying a graphical user interface comprising the steps of:

providing a plurality of generic frame objects in a hierarchy, providing a plurality of container components, each of the plurality of container components defining a respective menu/toolbar layout;

providing a component;

associating the component with a first one of the plurality of container components, and associating the first one of the plurality of container components with a first one of the plurality of generic frame objects;

displaying the component in a frame on a display, wherein a position of the frame and the menu/toolbar layout of the frame is a function of the first one of the plurality of container components, the first one of the plurality of generic frame objects, and any ancestor object of the first one of the plurality of generic frame objects;

in response to an event, disassociating the first one of the plurality of container components from the first one of the plurality of generic frame objects, and associating the first one of the plurality of container components with a second one of the plurality of generic frame objects; and displaying the component in the frame on the display, wherein a position of the frame and the menu/toolbar layout of the frame is a function of the first one of the plurality of container components, the second one of the plurality of generic frame objects, and any ancestor object of the second one of the plurality of generic frame objects, wherein, prior to the event, the component is associated with a third one of plurality of generic frame objects, the third one of the generic frame objects being a descendent of the first one of the plurality of generic frame objects, the component being a descendant of the first one of the container components.

10. The method of claim 7, wherein, prior to the event, the position of the frame and the menu/toolbar layout of the frame is a function of the first one of the plurality of container components, the third one of the plurality of generic frame objects, and any ancestor object of the third one of the plurality of generic frame objects.

11. The method of claim 10, wherein, after the event, the step of disassociating includes changing the hierarchy by disassociating the first one of the plurality of container components from the first one of the plurality of generic frame objects, and disassociating the component from the third one of the plurality of generic frame objects, the step of associating includes changing the hierarchy by associating the first one of the plurality of container components with the second one of the plurality of generic frame objects, and associating the component with a fourth one of the plurality of generic frame objects, the fourth one of the generic frame objects being a descendent of the second one of the plurality of generic frame objects and the step of displaying includes displaying the component in the frame on the display, wherein a position of the frame and the menu/toolbar layout of the frame is a function of the first one of the plurality of container components, the fourth one of the plurality of generic frame objects, and any ancestor object of the fourth one of the plurality of generic frame objects.

12. The method of claim 11, wherein the component is a view component.

13. The method of claim 11, wherein the component is a container component.

14. A method of displaying a graphical user interface comprising the steps of:

providing a plurality of components including an SDI container object and an MDI container object, the SDI container object defining a single document interface environment where a number of views are configured with each view having a corresponding menu bar and/or a corresponding tool bar, the MDI container object defining a multiple document interface where a parent view and a number of child views are configured, and wherein a common menu bar and/or common tool bar is provided for the parent view and the number of child views;

providing a plurality of generic frame objects, the generic frame objects including a tabbed frame object, an internal frame object, and a frame object;

providing a component;

associating the component with a first one of the plurality of components, and associating the first one of the plurality of components with a first one of the plurality of generic frame objects;

displaying the component in a frame on a display, wherein a position of the frame and the menu/toolbar layout of the frame is a function of the first one of the plurality of components and the first one of the plurality of generic frame objects;

in response to an event,
disassociating the component from the first one of the plurality of components, and
associating the component with a second one of the plurality of components, the second one of the plurality of components being associated with one of the plurality of generic frame objects; and displaying the component in the frame on the display, wherein a position of the frame and the menu/toolbar layout of the frame is a function of the second one of the plurality of components and the one of the plurality of generic frame objects, wherein, prior to the event, the component is associated with a third one of plurality of generic frame objects, the third one of the generic frame objects being a descendent of the first one of the plurality of generic frame objects, the component being a descendant of the first one of the container components.

15. The method of claim 14, wherein, prior to the event, the position of the frame and the menu/toolbar layout of the frame is a function of the first one of the plurality of container components, the third one of the plurality of generic frame objects, and any ancestor object of the third one of the plurality of generic frame objects.

16. The method of claim 15, wherein, after the event, the step of disassociating further includes disassociating disassociating the component from the third one of the plurality of generic frame objects, the step of associating further includes associating the component with another one of the plurality of generic frame objects, the another one of the generic frame objects being a descendent of the one of the plurality of generic frame objects and the step of displaying includes displaying the component in the frame on the display, wherein a position of the frame and the menu/toolbar layout of the frame is a function of the second one of the plurality of container components, the another of the plurality of generic frame objects, and any ancestor object of the another one of the plurality of generic frame objects.

17. The method of claim 16, wherein the component is a view component.

18. The method of claim 16, wherein the component is a container component.

19. A method for displaying a graphical user interface comprising the steps of:

providing a plurality of container components in a hierarchy, each of the plurality of container components defining a respective menu/toolbar layout;

associating each of the plurality of container components with a corresponding one of a plurality of generic frame objects, each of the plurality of generic frame objects having a corresponding frame displayed on a display;

wherein a position of each frame and the menu/toolbar layout of each frame is a function of its corresponding generic frame object and ancestors thereof in the hierarchy and its corresponding container component and ancestors thereof in the hierarchy;

in response to an event,
changing the hierachy; and
based on the changed hiearchy, disassociating at least one of the plurality of container components from its corresponding generic frame object, associating each of the at least one of the plurality of container components with another one of the plurality of generic frame objects, wherein a position of each frame and the menu/toolbar layout of each frame is a function of its corresponding generic frame object and ancestors thereof in the changed hierarchy and its corresponding container component and ancestors thereof in the changed hierarchy.

* * * * *